(12) United States Patent
Kim et al.

(10) Patent No.: US 9,649,710 B2
(45) Date of Patent: May 16, 2017

(54) METHOD FOR BRAZE-WELDING A FIXING PLATE AND A FLOW CHANNEL CAP IN A HEAT EXCHANGER, AND HEAT EXCHANGER PRODUCED BY SAME

(75) Inventors: Young Mo Kim, Gyeonggi-do (KR); Young Sik Choi, Seoul (KR)

(73) Assignee: KYUNGDONG NAVIEN CO., LTD., Gyeonggi-Do (KR)

( * ) Notice: Subject to any disclaimer, the term of this patent is extended or adjusted under 35 U.S.C. 154(b) by 873 days.

(21) Appl. No.: 13/265,314

(22) PCT Filed: Apr. 20, 2010

(86) PCT No.: PCT/KR2010/002445
§ 371 (c)(1),
(2), (4) Date: Oct. 31, 2011

(87) PCT Pub. No.: WO2010/123249
PCT Pub. Date: Oct. 28, 2010

(65) Prior Publication Data
US 2012/0037350 A1    Feb. 16, 2012

(30) Foreign Application Priority Data

Apr. 20, 2009   (KR) .................. 10-2009-0034256

(51) Int. Cl.
*F28F 9/02* (2006.01)
*B23P 15/26* (2006.01)
(Continued)

(52) U.S. Cl.
CPC ............. *B23K 1/0012* (2013.01); *F24H 1/40* (2013.01); *F24H 9/146* (2013.01); *F28D 7/08* (2013.01);
(Continued)

(58) Field of Classification Search
CPC ...... F28F 9/0219; F28F 9/0243; F28F 9/0246; F28F 9/0248; F28F 9/06; F28F 9/08;
(Continued)

(56) References Cited

U.S. PATENT DOCUMENTS 3,982,587 A * 9/1976 Tramontini .................. 165/149
5,297,624 A * 3/1994 Haussmann et al. ......... 165/173
(Continued)

FOREIGN PATENT DOCUMENTS

JP    S62-156281    10/1987
JP    S63-148094    6/1988
(Continued)

OTHER PUBLICATIONS

English language Abstract for JP S63-148094.
(Continued)

*Primary Examiner* — Jianying Atkisson
*Assistant Examiner* — Harry Arant
(74) *Attorney, Agent, or Firm* — Novick, Kim & Lee, PLLC; Jae Youn Kim (57) ABSTRACT

The present invention relates to a method for braze-welding a fixing plate and a flow channel cap in a heat exchanger, and to a heat exchanger produced by same. The method includes: providing a fixing plate 10 having a plurality of resilient protrusions 11 for snap-fitting; providing a flow channel cap 20, one end 22 of which is L-shaped to be snap-fitted onto the resilient protrusion 11 and the other end of which has a stepped portion 21; inserting the stepped portion 21 of the flow channel cap 20 into the resilient protrusion 11 such that an end 21b of the stepped portion 21 contacts an end of the resilient protrusion 11; pressing the L-shaped end 22 of the flow channel cap 20 against the resilient protrusion 11 of the fixing plate 10 such that the L-shaped end 22 is snap-fitted onto the resilient protrusion 11 and thus tightly contacts the (Continued)

fixing plate 10, and the resilient protrusion 11 thus press-contacts the end 21b of the stepped portion 21 to enable an end 21a of the stepped portion 21 to tightly contact the fixing plate 10; and braze-welding the fixing plate 10 and the flow channel cap 20. The above-described method eliminates a spot-welding process which might otherwise be performed prior to the process of braze-welding the fixing plate and the flow channel cap in conventional heat exchangers, to thereby reduce manufacturing costs and labor and to improve productivity.

2 Claims, 6 Drawing Sheets

(51) Int. Cl.
  *B23K 1/00* (2006.01)
  *F24H 1/40* (2006.01)
  *F28D 7/08* (2006.01)
  *F28D 7/16* (2006.01)
  *F28F 9/26* (2006.01)
  *F24H 9/14* (2006.01)
  *B23K 101/14* (2006.01)

(52) U.S. Cl.
  CPC ........... *F28D 7/087* (2013.01); *F28D 7/1607* (2013.01); *F28F 9/0224* (2013.01); *F28F 9/268* (2013.01); *B23K 2201/14* (2013.01); *F28F 2275/04* (2013.01); *F28F 2275/085* (2013.01); *Y10T 29/49393* (2015.01)

(58) Field of Classification Search
  CPC .. F28F 9/12; F28F 9/14; F28F 2220/00; F28F 2255/02; F28F 2275/08; F28F 2275/085; F28F 2275/10; F28F 2275/12; F28F 2275/125; F28F 2275/14; F28F 9/02; F28F 9/0224

USPC .......... 165/173, 175, 149; 228/135–137, 183
See application file for complete search history.

(56) References Cited

U.S. PATENT DOCUMENTS

| | | | |
|---|---|---|---|
| 5,366,008 A * | 11/1994 | Kadle et al. | 165/173 |
| 5,758,721 A * | 6/1998 | Letrange et al. | 165/173 |
| 6,082,446 A * | 7/2000 | Ahaus et al. | 165/173 |
| 6,971,444 B2 * | 12/2005 | Lamich | 165/173 |
| 2002/0029866 A1* | 3/2002 | Gille | F28D 1/0435 165/76 |
| 2005/0016717 A1* | 1/2005 | Lamich et al. | 165/149 |
| 2008/0142200 A1* | 6/2008 | Velzy et al. | 165/149 |

FOREIGN PATENT DOCUMENTS

| | | |
|---|---|---|
| JP | 05-057385 A | 3/1993 |
| JP | 08-141668 A | 6/1996 |
| JP | 2000-042729 A | 2/2000 |
| JP | 2002-139289 A | 5/2002 |
| JP | 2004-108613 A | 4/2004 |
| JP | 2005-147571 A | 6/2005 |
| KR | 10-0649437 B | 11/2006 |

OTHER PUBLICATIONS

Japanese Office Action in a counterpart foreign Patent Application No. 2012-507145 mailed on Feb. 5, 2013.
English language translation of Japanese Office Action.
English Abstract of KR 10-0649437 B.
English Abstract of JP 2002-139289 A.
English Abstract of JP 05-057385 A.
English Abstract of JP 2004-108613 A.
English Abstract of JP 2000-042729 A.
English Abstract of JP 2005-147571 A.
English Abstract of JP 08-141668 A.
International Search Report mailed Dec. 20, 2010.

* cited by examiner

FIG. 1

(PRIOR ART)

FIG. 2

(PRIOR ART)

METHOD FOR BRAZE-WELDING A FIXING PLATE AND A FLOW CHANNEL CAP IN A HEAT EXCHANGER, AND HEAT EXCHANGER PRODUCED BY SAME

TECHNICAL FIELD

The present invention relates to a method for brazing a fixing plate and a flow channel cap in a heat exchanger and a heat exchanger produced by the method. More particularly, the present invention relates to a method of brazing a fixing plate and a flow channel cap in a heat exchanger which can simplify the work of brazing a flow channel cap for closing an end of a heat exchanging pipe to a fixing plate, and a heat exchanger produced by the method.

BACKGROUND ART

In general, examples of a combustor that can heat heating water flowing through the inside of a heat exchanging pipe in a combustion chamber by using a burner may include a boiler and a water heater. That is, the boiler that is used in a general home, a public building, or the like is used for heating and hot water and the water heater heats cold water up to a predetermined temperature within a short time to allow a user to conveniently use the hot water. Most of the combustors such as the boiler and the water heater are constituted by a system that uses oil or gas as fuel and combusts the oil or gas by means of a burner, heat water by using combustion heat generated in the course of the combustion, and supplies the heated water (hot water) to a user.

The combustor is equipped with a heat exchanger for transmitting the combustion heat generated from the burner to the heating water flowing through the heat exchanging pipe.

Figure 1:
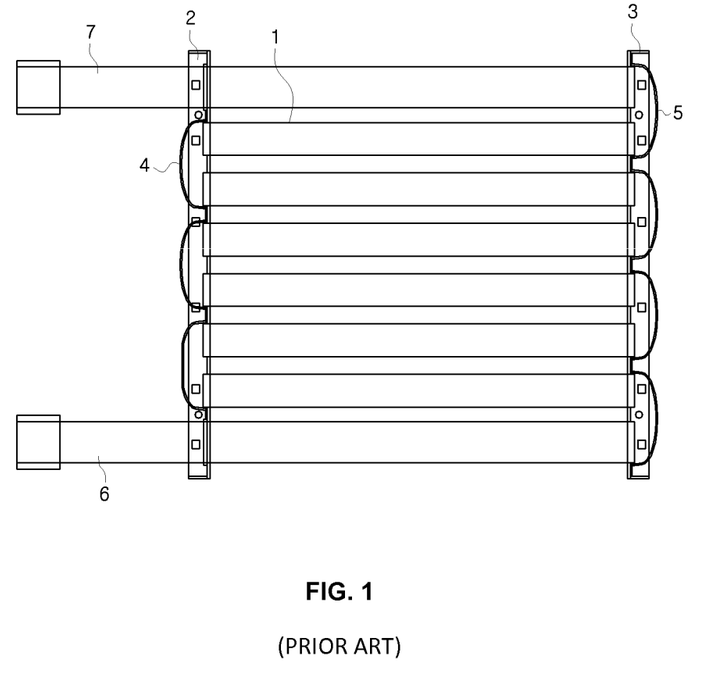
FIG. 1 is a schematic cross-sectional view of a heat exchanger in the related art.

FIG. 1 is a schematic cross-sectional view of a heat exchanger in the related art.

The heat exchanger includes a heat exchanging pipe 1, fixing plates 2 and 3, flow channel caps 4 and 5, a heating water inlet 6, and a heating water outlet 7.

The heat exchanging pipe 1 has a cylindrical cross-section with ends open and a plurality of heat exchanging pipes 1 is longitudinally stacked. The fixing plates 2 and 3 have pipe insertion holes longitudinally arranged at regular intervals and both ends of the heat exchanging pipes are inserted in the pipe insertion holes, respectively. The flow channel caps 4 and 5 are welded to the fixing plate 2 and 3, respectively, and form parallel flow channels by closing both open ends of the heat exchanging pipes 11. The lower portions of the flow channel caps 4 and 5 are connected with the heating water inlet 6 and the upper portion is connected with the heating water outlet 7.

The fixing plates 2 and 3 and the flow channel caps 4 and 5 are bonded usually by brazing, i.e., braze-welding. Brazing is one type of welding that brings two base metals to weld at a high temperature of 500° C. or more in close contact with each other and welds the base metals by supplying a brazing filler metal therebetween. The brazing is widely used because of the advantages of high bonding strength, precise bonding, and ease of automation. When the two base metals are not in sufficiently close contact with each other in brazing, the base metals are not bonded, and even if they are bonded, the bonding is incomplete. Therefore, it is the most important to bring the two base metals to weld in close contact with each other in brazing.

Figure 2:
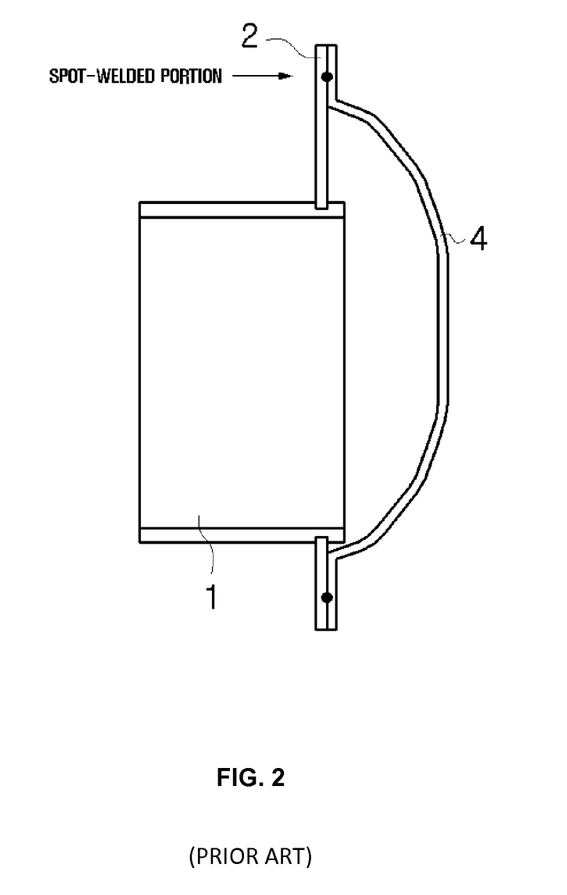
FIG. 2 is a view illustrating a method of bring a fixing plate and a flow channel cap in sufficiently closed contact with each other before brazing in the related art.

FIG. 2 is a view illustrating a method of bring the fixing plate 2 and the flow channel cap 4 in sufficiently close contact with each other before brazing in the related art.

The flow channel cap 4 is placed on the fixing plate 2 and then the fixing plate 2 and the flow channel cap 4 are brought in sufficiently close contact with each other by spot-welding at predetermined positions in advance along the joint. Thereafter, brazing is performed in a brazing furnace.

However, this method has a problem in that labor and manufacturing cost increase due to an additional process because spot-welding is necessary before brazing.

DISCLOSURE

Technical Problem

The present invention has been made in an effort to provide a method of brazing a fixing plate and a flow channel cap in a heat exchanger that makes it possible to reduce manufacturing cost and labor by removing spot-welding before brazing the fixing plate and the flow channel cap in a heat exchanger of the related art, and a heat exchanger produced by the method.

Technical Solution

A heat exchanger according to an exemplary embodiment of the present invention includes: a plurality of heat exchanging pipes with both ends open, through which heat water flows; a fixing plate where both ends of each of the heat exchanging pipes are inserted; and flow channel caps brazed to the fixing plate to form parallel flow channels by closing both ends of the heat exchanging pipes, in which a plurality of resilient protrusions for snap-fitting is formed at the fixing plate, the flow channel cap has one L-shaped end to come in close contact with the fixing plate by snap-fitting with the resilient protrusion and the other end with a stepped portion, and an end of the stepped portion is in press-contact with the resilient protrusion and a base end of the stepped portion is in close contact with the fixing plate.

A method of brazing fixing plate and a flow channel cap according to an exemplary embodiment of the present invention in a heat exchanger including a plurality of heat exchanging pipes with both ends open, through which heat water flows; the fixing plate where both ends of each of the heat exchanging pipes are inserted; and the flow channel caps brazed to the fixing plate to form parallel flow channels by closing both ends of the heat exchanging pipes, the method includes: providing a fixing plate having a plurality of resilient protrusions for snap-fitting; providing a flow channel cap, one end of which is L-shaped to be snap-fitted onto the resilient protrusion and the other end of which has a stepped portion; inserting the stepped portion of the flow channel cap into the resilient protrusion such that an end of the stepped portion contacts an end of the resilient protrusion; pressing the L-shaped end of the flow channel cap against the resilient protrusion of the fixing plate such that the L-shaped end is snap-fitted onto the resilient protrusion and thus tightly contacts the fixing plate, and the resilient protrusion thus press-contacts the end of the stepped portion to enable an end of the stepped portion to tightly contact the fixing plate; and brazing the fixing plate and the flow channel cap.

Advantageous Effects

According to exemplary embodiments of the present invention, it is possible to remove the process of spot-welding before brazing a fixing plate with a flow channel cap in a heat exchanger in the related art. Therefore, as the process of spot-welding is removed, the manufacturing cost and labor can be reduced while productivity is improved.

EXPLANATION OF MAIN REFERENCE NUMERALS AND SYMBOLS

10: Fixing plate
11: Resilient protrusion
20: Flow channel cap
21: Stepped portion
21a: Base
21b: End
22: L-shaped end Best Mode Hereinafter, the configuration and operation of preferred embodiments of the present invention will be described in detail with reference to the accompanying drawings. Giving reference numerals to components in the drawings herein, it is noted that the same components are designated by substantially the same reference numerals, even though they are shown in different drawings.

The configuration of a heat exchanger according to an exemplary embodiment of the present invention is the same for the most part as that of the heat exchange of the related art shown in FIG. 1. Therefore, the heat exchanger according to the exemplary embodiment of the present invention includes a plurality of heat exchanging pipes with both ends open, through which heat water flows, fixing plate where both ends of the heat exchanging pipes are fitted, and flow channel caps welded to the fixing plate to form parallel flow channels by closing both ends of the heat exchanging pipes.

However, an exemplary embodiment of the present invention includes a fixing plate 10 and flow channel caps 20 which have different configurations from the related art in order to remove spot-welding before brazing the fixing plate and the flow channel caps in the heat exchanger of the related art.

Figure 3A:
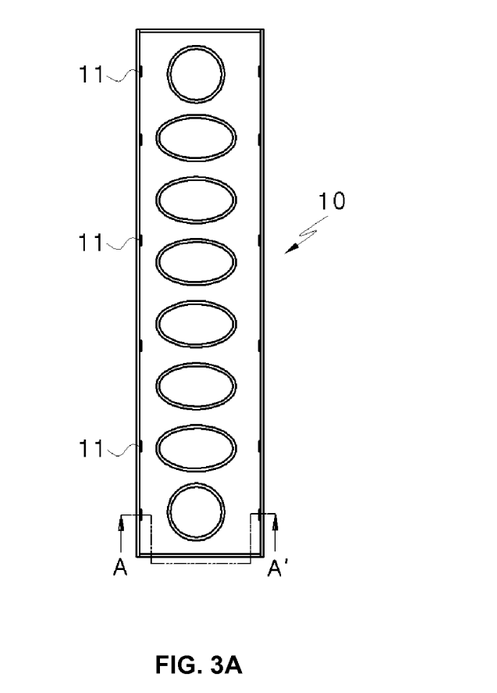
FIG. 3A is a front view of a fixing plate according to an exemplary embodiment of the present invention and FIG. 3B is a cross-sectional view taken along the line A-A' in FIG. 3A.
Figure 3B:
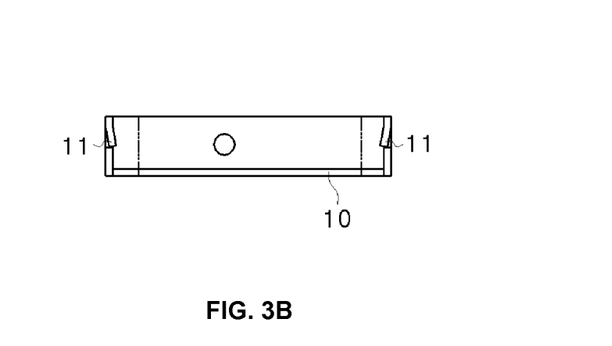
Figure 4A:
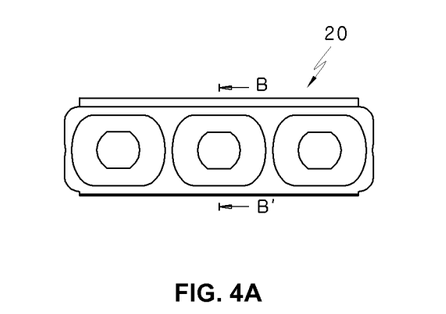
FIG. 4A is a front view of a flow channel cap according to an exemplary embodiment of the present invention.
Figure 4B:
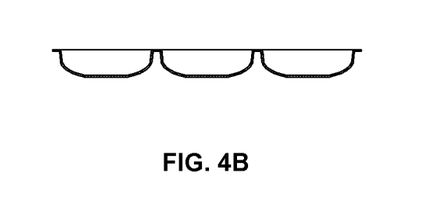
FIG. 4B is a plan view.
Figure 4C:
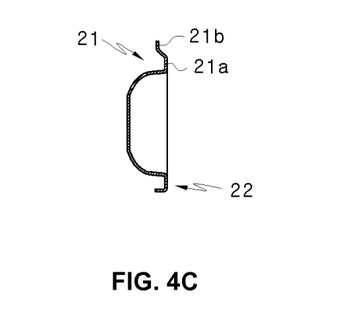
FIG. 4C is a cross-sectional view taken along the line B-B' in FIG. 4A.

FIG. 3A is a front view of the fixing plate 10 according to an exemplary embodiment of the present invention and FIG. 3B is a cross-sectional view taken along the line A-A' in FIG. 3A. FIG. 4A is a front view of the flow channel cap 20 according to an exemplary embodiment of the present invention, FIG. 4B is a plan view, and FIG. 4C is a cross-sectional view taken along the line B-B' in FIG. 4A.

A plurality of resilient protrusions 11 for snap-fitting with the ends of the flow channel cap 20 is formed (for example, six at each end) at the fixing plate 10. One end of the flow channel cap 20 is formed in an L-shape to be in close contact with the fixing plate 10 by snap-fitting to the resilient protrusion 11.

The other end of the flow channel cap 20 has a stepped portion 21. The end 21b of the stepped portion 21 is formed to be able to be in press-contact with the resilient protrusion 11 and the base 21a of the stepped portion 21 is formed to be able to be in close contact with the fixing plate 10.

FIG. 5 is a view showing when the flow channel cap 20 is fixed in close contact with the fixing plate 10, according to an exemplary embodiment of the present invention.

Figure 5A:
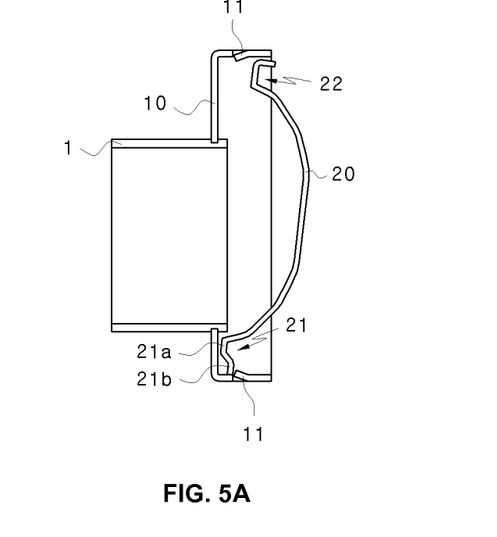
FIG. 5 is a view showing when a flow channel cap 20 is fixed in close contact with a fixing plate 10, according to an exemplary embodiment of the present invention.

First, as shown in FIG. 5A, the end 21b of the stepped portion 21 comes in contact with the end of the resilient protrusion 11 by inserting the stepped portion 21 of the flow channel cap 20 inside the resilient protrusion 1 of the fixing plate 10.

Figure 5B:
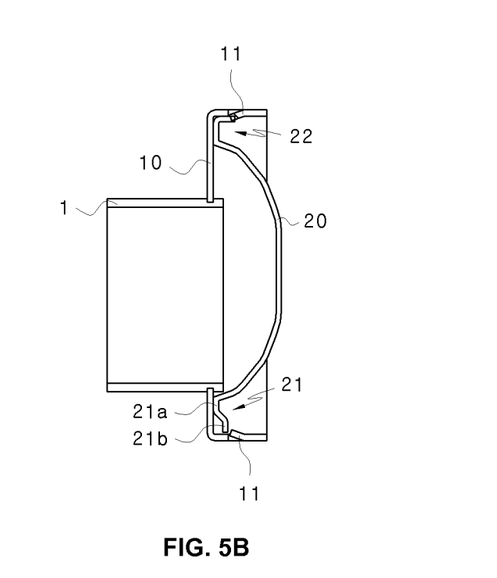

Thereafter, as shown in FIG. 5B, the L-shaped end 22 is snap-fitted to the resilient protrusion 11 by pressing the L-shaped end 22 of the flow channel cap 20 onto the resilient protrusion 11 of the fixing plate 10. Accordingly, the L-shaped end 22 of the flow channel cap 20 comes in close contact with the fixing plate 10.

Further, the end 21b of the stepped portion 21 is retained by the end of the resilient protrusion 11, in press-contact with the end of the resilient protrusion 11. Accordingly, the base end 21a of the stepped portion 21 comes in close contact with the fixing plate 10. FIG. 5B shows when the L-shaped end 22 of the flow channel cap 20 and the base end 21a of the stepped portion 21 are completely in close contact with the fixing plate 10.

Figure 6:
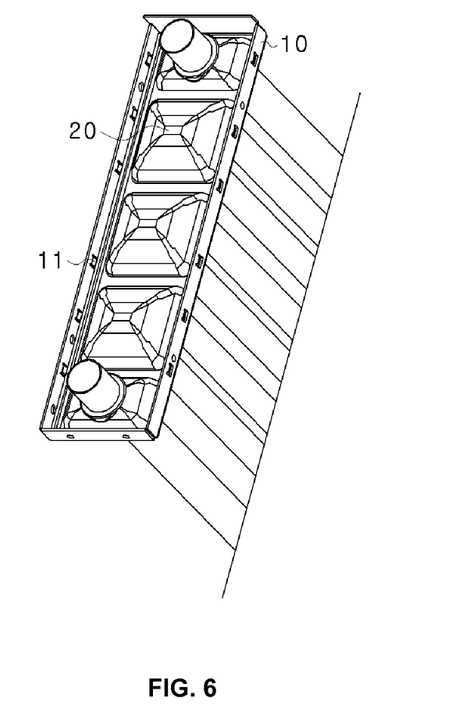
FIG. 6 is a view showing when bonding of the fixing plate 10 and the flow channel cap 20 is completed, according to an exemplary embodiment of the present invention.

Next, the fixing plate 10 and the flow channel cap 20 are put into a brazing furnace and brazed at a high temperature. FIG. 6 is a view showing when bonding of the fixing plate 10 and the flow channel cap 20 is finished.

According to the method, it is possible to remove the process of spot-welding before brazing a fixing plate with a flow channel cap in the related art. As the process of spot-welding is removed, the manufacturing cost can be reduced. Further, labor is reduced by the removal of the process, such that productivity is improved.

The present invention is not limited to the exemplary embodiments, but it will be apparent to those skilled in the art that various modification and changes may be made without departing from the scope and spirit of the present invention.

The invention claimed is:
1. A heat exchanger comprising:
a plurality of heat exchanging pipes with both ends open, through which heat water flows;
a fixing plate where both ends of each of the heat exchanging pipes are inserted; and
flow channel caps connected to the fixing plate to form parallel flow channels by closing the both ends of each of the heat exchanging pipes,
wherein the fixing plate comprises a continuous planar portion and an edge portion extending from an edge of the continuous planar portion, the edge portion has a plurality of protrusions protruding from a surface of the edge portion, and each of the plurality of protrusions has an inclined surface extending inwardly toward the continuous planar portion from the surface of the edge portion at an obtuse angle, and at least one of the flow channel caps has a first end which is L-shaped and a second end with a stepped portion, the first end comprising a first portion having a planar shape and a second portion extending perpendicularly from an end of the first portion, the first portion being in contact with the planar portion but not being in contact with the edge portion, the second portion being in contact with the edge portion but not being in contact with the planar portion, an end of the second portion being in contact with one of the plurality of protrusions, a base end of the stepped portion being in contact with the planar portion such that one side of the base end is in contact with one side of the planar portion that is facing the one side of the base end, and an end of the stepped portion being in press-contact with another of the plurality of protrusions while not in contact with the planar portion such that the end of the stepped portion is spaced apart from one side of the planar portion that is facing the end of the stepped portion.

2. A method of brazing a fixing plate and a flow channel cap in a heat exchanger including: a plurality of heat exchanging pipes with both ends open, through which heat water flows; the fixing plate where both ends of each of the heat exchanging pipes are inserted; and the flow channel caps brazed to the fixing plate to form parallel flow channels by closing both ends of the heat exchanging pipes, the method comprising:

providing the fixing plate having a continuous planar portion and an edge portion extending from an edge of the continuous planar portion, the edge portion has a plurality of protrusions for snap-fitting protruding from a surface of the edge portion, and each of the plurality of protrusions has an inclined surface extending inwardly toward the continuous planar portion from the surface of the edge portion at an obtuse angle;

providing the flow channel cap, a first end of which is L-shaped to be snap-fitted onto the respective protrusion and a second end of which has a stepped portion;

inserting the stepped portion of the flow channel cap into the respective protrusion such that an end of the stepped portion contacts an end of another of the plurality of protrusions;

pressing the the first end of the flow channel cap against the protrusion of the fixing plate such that the the first end is snap-fitted onto the respective protrusion and thus tightly contacts the fixing plate, and the respective protrusion thus press-contacts the end of the stepped portion to enable a base end of the stepped portion to tightly contact the fixing plate, such that the first end comprises a first portion having a planar shape and a second portion extending perpendicularly from an end of the first portion, the first portion being in contact with the planar portion but not being in contact with the edge portion, the second portion being in contact with the edge portion but not being in contact with the planar portion, the end of the second portion being in contact with the respective protrusion, the base end of the stepped portion being in contact with the planar portion such that one side of the base end is in contact with one side of the planar portion that is facing the one side of the base end, and the end of the stepped portion being in press-contact with the another of the plurality of protrusions while not in contact with the planar portion such that the end of the stepped portion is spaced apart from one side of the planar portion that is facing the end of the stepped portion; and brazing the fixing plate and the flow channel cap.

* * * * *